J. A. THOMSON.
Door-Knob Fastening.
No. 197,185. Patented Nov. 13, 1877.
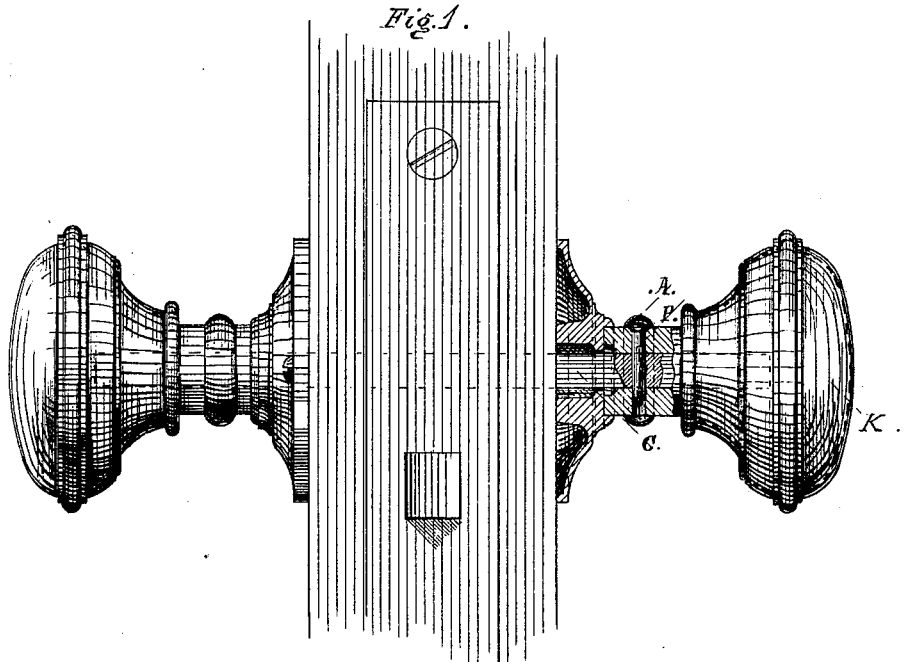
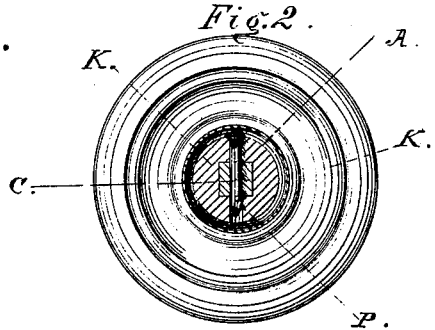
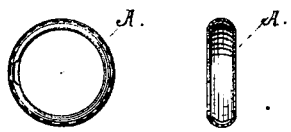
Attest:
Chas. H. Kinyon
Caleb C. Collins
Inventor:
James A. Thomson

UNITED STATES PATENT OFFICE.

JAMES A. THOMSON, OF NEWARK, NEW JERSEY.

IMPROVEMENT IN DOOR-KNOB FASTENINGS.

Specification forming part of Letters Patent No. 197,185, dated November 13, 1877; application filed September 27, 1877.

*To all whom it may concern:*

Be it known that I, JAMES A. THOMSON, of Newark, in the county of Essex and State of New Jersey, have invented a new and useful Improvement in Door-Knob Fastening, which improvement is fully set forth in the following specification and accompanying drawings, of which—

Figure 1 is a perspective view of a door-knob with my fastener attached; Fig. 2, a front view of the fastener, and Fig. 3 a longitudinal section of the movable ring.

The object of my invention is to furnish a device by which to connect or disconnect a door-knob with the bar attached to the lock for working the same.

In the drawings, A is the movable ring, the inner circumference of which is made concave, to pass over and secure the connecting-pin P. P is the connecting-pin, to be secured by the movable ring A. C is the spindle, connected to the lock, through which the pin P passes, and K is the door-knob to be secured.

When the movable ring A is in position the projection of the pin P retains the ring A in its place, as well as the ring securing the pin.

The ring A is split, and made to spring open when passing over the head of the pin P, and spring back when the head of the pin is passed, in attaching or detaching, which is done by turning the ring until the small notch in it (shown in Fig. 3) comes opposite the head of the pin, when, by a slight pressure with the fingers, the ring will spring open, and allow the head of the pin to pass through, and, when attached, the ring can be turned around until the split in it is on the opposite side from the head of the pin.

The spindle C, connecting with the lock, has simply plain holes drilled in, corresponding with the size of one in the knob, to admit the pin.

It will be seen from the foregoing that the hole in the knob K may be drilled only far enough to allow the pin P to pass through the spindle C, in which case no head would be required on the pin P; but its projection outside of the knob would be of the same size in diameter as the body of the pin.

I am aware that spring-collars have already been made, slitted transversely, somewhat like mine, and combined with the knob and the screw, for holding the spindle therein; and I do not, therefore, make a general claim to such collars, but consider it as a great improvement to make the ring concave in section, as shown, and to use the same in connection with a plain pin, thereby greatly diminishing the cost of securing the knob, as there are no holes to tap in the spindle, or screw to fit to the same.

Having thus described my invention, what I claim as new, and desire to secure by Letters Patent, is—

The elastic metallic ring A, constructed of concave section, to fit the head or end of a pin, P, passing through the collet and spindle of a door-knob, and provided with a partial notch, to pass readily over the projecting end of the pin, and made with overlapping ends at the elastic joint, so that when sprung into its place on the shank of the knob the joint may be fully concealed.

JAMES A. THOMSON.

Witnesses:
JACOB R. WILLIAMS,
CALEB C. COLLINS.